United States Patent [19]

Drews et al.

[11] Patent Number: 4,531,137

[45] Date of Patent: Jul. 23, 1985

[54] THERMOREMANENT MAGNETIC IMAGING METHOD

[75] Inventors: Reinhold E. Drews, Pittsford; Almon P. Fisher, Rochester; Herman A. Hermanson, Penfield; Stephen F. Pond, Fairport, all of N.Y.

[73] Assignee: Xerox Corporation, Stamford, Conn.

[21] Appl. No.: 515,720

[22] Filed: Jul. 20, 1983

[51] Int. Cl.[3] .............................................. G01D 12/15

[52] U.S. Cl. ...................................... 346/74.4; 360/59

[58] Field of Search ................. 346/74.4, 74.5; 360/59

[56] References Cited

U.S. PATENT DOCUMENTS

| | | | |
|---|---|---|---|
| 3,521,294 | 6/1970 | Treves . | |
| 3,555,556 | 1/1971 | Nacci | 346/74 |
| 3,698,005 | 10/1972 | Nacci et al. | 346/74 |
| 3,791,843 | 2/1974 | Kohlmannsperger | 117/17.5 |
| 3,804,511 | 4/1974 | Rait et al. | 355/17 |
| 3,845,306 | 10/1974 | Kohlmannsperger | 250/316 |
| 3,935,578 | 1/1976 | Condon et al. . | |
| 4,032,923 | 6/1977 | Pond et al. | 346/74.1 |
| 4,074,280 | 2/1978 | Kojima et al. | 346/76 R |
| 4,216,282 | 8/1980 | Edwards et al. . | |
| 4,294,901 | 10/1981 | Genovese | 430/39 |
| 4,343,008 | 8/1982 | Swigert | 346/74.2 |
| 4,425,568 | 1/1984 | Moriguchi et al. | 346/76 PH |
| 4,427,987 | 1/1984 | Kikuchi | 346/74.4 X |
| 4,442,441 | 4/1984 | Kikuchi et al. | 346/74.4 |
| 4,451,835 | 5/1984 | Saito | 346/76 PH |

FOREIGN PATENT DOCUMENTS

| | | |
|---|---|---|
| 2131068 | 1/1973 | Fed. Rep. of Germany . |
| 1288318 | 4/1969 | United Kingdom . |

*Primary Examiner*—Thomas H. Tarcza
*Attorney, Agent, or Firm*—Robert A. Chittum

[57] ABSTRACT

An energy efficient thermoremanent magnetic imaging method and apparatus comprising a moving magnetic recording medium which is passed through a nip formed by a thermal printhead and a pressure roller, so that the magnetizable surface of the recording medium is in pressure contact with the heating elements of the thermal printhead. The recording medium is pre-magnetized prior to entry in the nip and passed through a magnetic field of lower strength and opposite polarity at the nip. Small areas or pixels of the pre-magnetized recording medium are heated by the thermal printhead in image configuration and allowed to cool in the presence of the magnetic field at the nip. The magnetic poles of the imagewise pixels are switched, forming fringe fields between the pixels and pre-magnetized background areas. The pixels with the switched magnetic poles are spaced from each other to prevent the fringe fields from forming around the periphery of clusters of pixels and collapsing in between some or all of the pixels making up the cluster.

8 Claims, 3 Drawing Figures

THERMOREMANENT MAGNETIC IMAGING METHOD

FIELD OF THE INVENTION

The present invention relates to thermoremanent magnetic imaging and more particularly to an energy efficient thermoremanent magnetic imaging station in a magnetographic printer using a thermal printhead and a pre-magnetization of the recording medium to produce improved latent magnetic images which, when developed with magnetic toner, are capable of providing high density images.

DESCRIPTION OF THE PRIOR ART

It is known that heating a ferromagnetic material above a certain temperature will cause it to become paramagnetic. The temperature at which the ferromagnetic material loses its ferromagnetic properties is referred to the Curie temperature. Normally, reversing the process or cooling the material below the Curie temperature will restore the ferromagnetic properties.

One important parameter of a ferromagnetic material affected by the temperature-induced phase change is a loss of remanent magnetization stored in the ferromagnetic material before it is heated. Generally, after the application of a sufficiently large magnetic field to a ferromagnetic and its removal, the material will show a magnetic field of a certain magnitude and polarity that is remanent or remains. However, when a material having a remanent magnetization is carried into the paramagnetic phase by heating, the remanent magnetization is lost. Thus, the heating of a ferromagnetic material beyond its Curie temperature is used for erasing magnetization stored in a material. Further, since the coercivity of a ferromagnetic material is also a function of temperature and decreases to zero at the Curie point, the heating of a ferromagnetic material beyond its Curie point and cooling it in the presence of a magnetic field is a method of recording a magnetization therein based upon the applied magnetic field.

The formation of a graphic image on a magnetizable surface by thermomagnetic recording or erasing with processes similar to these methods is known in the art. Particularly, a U.S. Pat. No. 3,555,556 issued to Nacci and the background patents cited therein are illustrative of references that describe the recording of optical images on magnetic media. Not only have direct thermomagnetic copying processes been described in the art, but also those termed "reflexive." U.S. Pat. No. 3,698,005 and references cited therein describe a recording member for reflexive imaging where a magnetic material is heated beyond its Curie temperature by a flash procedure.

Thermoremanent magnetic imaging, from the above discussion, is simply an imaging technique that creates a latent magnetic image on a ferromagnetic material that is usually, but not necessarily, coated on an insulating substrate. The image is created by locally heating portions of the coating material above the Curie temperature point to achieve a phase change in magnetic properties and simultaneously applying a magnetic field so that as the coating material cools in the presence of the applied magnetic field, the remanent magnetization from the applied field remains in the coating material, resulting in a latent magnetic image in the coating material. Such a latent magnetic image may be developed with magnetic toner, the toner transferred to appear in image configuration and fixed thereto for a permanent copy.

U.S. Pat. No. 4,294,901 to Genovese discloses a multi-layered substrate for thermoremanent magnetic imaging. A conductive stylus array provides current through the substrate to heat locally selected portions in image configuration to the Curie temperature of the substrate. A magnetic latent image is formed when the heated portion of the member is allowed to cool in an externally applied magnetic field at a strength of between 10 and 200 gauss. In another embodiment, the substrate is pre-magnetized and the background image areas of the substrate are heated to the Curie temperature. The substrate is thereafter cooled in the absence of any externally applied magnetic field. In each embodiment, the latent image is developed by contacting the substrate containing the latent image with magnetic toner and transferring the developed image to a permanent sheet of, for example, paper and fixing the developed image thereto.

U.S. Pat. No. 3,804,511 to Rait et al. teaches the use of a tape having a recording medium on the surface which is magnetizable and capable of forming an electrostatic image. After a latent electrostatic image is formed and the image on the recording medium developed with with toner having both an electrostatically attractive component and a magnetic component, the side of the tape opposite to the one containing the developed image is subjected to a continuous AC magnetizing current which applies a uniform magnetic recording in the recording medium through the tape. A latent magnetic image is formed in th recording medium by applying a magnetic erasing signal to the tape from the side of the tape confronting the developed image through the toner image, so that the toner shields the recording medium and only the non-image area of the recording medium is erased. Therefore, a latent magnetic image corresponding to or duplicating the latent electrostatic image is formed. The aim of Rait et al. was to enable multiple copies to be made from one latent image. After the first image was produced electrophotographically, the second and subsequent copies were obtained by developing the latent magnetic image with the same toner (that has a magnetic component) and transferring the developed image to paper without removing the latent magnetic image which is retained in the recording medium until specifically erased by another magnetic erasing signal applied after the last developed image is transferred to paper.

U.S. Pat. No. 4,032,923 to Pond et al. discloses a thermoremanent magnetographic imaging apparatus which copies xerographically produced images from a slave web onto a magnetizable surface of a master web. The thermomagnetic transfer is produced by exposing the slave and master webs while in intimate contact to a single intense burst of radiation from a Xenon lamp. The master web is pre-recorded in alternating patterns of magnetization by an AC recording head. The frequency at which the record head is gated by the alternating current source determines the final image resolution. The radiant energy from the lamp raises the temperature of the master web above its Curie point in the non-image areas, thus erasing the pre-magnetization pattern of alternating magnetic pole directions in the non-image areas. The remaining image is then developed by magnetic toner and transferred to a copy sheet.

U.S. Pat. No. 4,343,008 to Swigert discloses a method of making a magnetic imaging master capable of development with magnetic toner and transfer of the developed image many times. The master is made by pre-magnetizing the master and inserting it into a conventional typewriter where character images are typed on a backing layer of the master creating a right reading image therein. The master is then flash exposed to a Xenon lamp which erases all pre-magnetized areas not shielded by the typed characters.

U.S. Pat. No. 3,791,843 and U.S. Pat. No. 3,845,306 to Kohlmannsperger disclose method and apparatus, respectively for thermomagnetic imaging. These cases disclose the use of particular compounds such as Fe Rh, as a coating on the magnetic recording medium. Such compounds are antiferromagnetic at temperatures above and below a particular temperature known as the Neel temperature. In one embodiment, the coated recording medium is on a rotatable drum which is internally heated to its Neel temperature, and an original document is radiantly exposed on the recording medium at an exposure station in the typical successive incremental fashion well known in the art. The radiant exposure source emits radiant energy which passes through the original document, impinging on the recording medium. Those portions of the recording medium which register with the image-free portions of the original document are heated by the radiant source to a temperature above the normal Neel temperature. Consequently, such portions exhibit greatly reduced coercive force which is so weak that magnetic toner will not be retained at a development station.

Thus, it is known to pre-magnetize a magnetic recording medium with an alternating recording head to produce alternating rows of magnetic pole directions and to erase the background areas by raising the temperature of the recording medium in the background areas above the Curie point for that particular recording medium. In all known prior art, however, it is the background areas which are heated and the typical document contains about 95% background. This background erasure in thermoremanent magnetic imaging leads to excessive energy usage.

SUMMARY OF THE INVENTION

It is the object of this invention to reduce the energy usage of a thermoremanent magnetic imaging device by heating only the image areas of a pre-magnetized recording medium to its Curie point temperature in order to produce the latent magnetic image.

It is another object of this invention to use a conventional thermal printhead to perform the heating of small regions or pixels in the layer of magnetizable material of the recording medium to erase the premagnetization of the recording medium in the image configuration.

It is still another object of this invention to implant magnetization of a polarity opposite to that of the pre-magnetization in the pixel areas forming the image so that magnetic fringe fields are produced between the pixel areas and the background areas.

A further object of this invention is to increase the quality of copies produced with a thermoremanent magnetographic printer using this invention by spacing the pixels so that the fringe fields produced by the individual pixels with the pre-magnetized background region are provided on an individual basis rather than in groups of pixels where the fringe field would occur around the periphery of the group of pixels.

In the present invention, a magnetic recording medium is pre-magnetized in a uniform, in-plane fashion using permanent magnets. The pre-magnetized recording medium is conveyed into a nip formed by a thermal printhead and a force-biased roller which urges the recording medium into contact with the thermal printhead. At this nip, a magnetizing field is provided having a strength of about ⅓ to 2/5 that of the pre-magnetizing magnet and having an opposite magnetizing direction. The magnetizing force of the magnetic field at the nip is not of sufficient strength to overcome the polarizing direction produced by the pre-magnetizing magnet. However, when the thermal printhead heats the pixel areas of the recording medium in image configuration above its Curie point, the pre-magnetization is erased and replaced by that of the magnetic field at the nip as the heated region cools. Thus, the direction of the layer magnetization in the heated pixel areas is switched by the magnetic field at the nip. The pixel areas are allowed to cool in the magnetic field at the nip, thus, freezing the switched magnetization regions and setting up magnetic fringe fields between the regions of different magnetic direction, i.e., the pixel areas making up the latent image and the pre-magnetized background areas.

By appropriate timing or data buffering, the preceding and succeeding pixels produced by each thermal element in the thermal printhead are spaced so that each individual pixel causes a small fringe field to occur with the pre-magnetized background that will subsequently attract and hold magnetic toner during development of the latent magnetic image. If the pixels are allowed to group too closely together, the fringe field will occur on the outer periphery of the group and that part of the image area inside the group of pixels will not attract and hold magnetic toner, resulting in a hole or blank spot, which would reduce the quality of the final copy of the image.

DESCRIPTION OF THE PREFERRED EMBODIMENT

Figure 1:
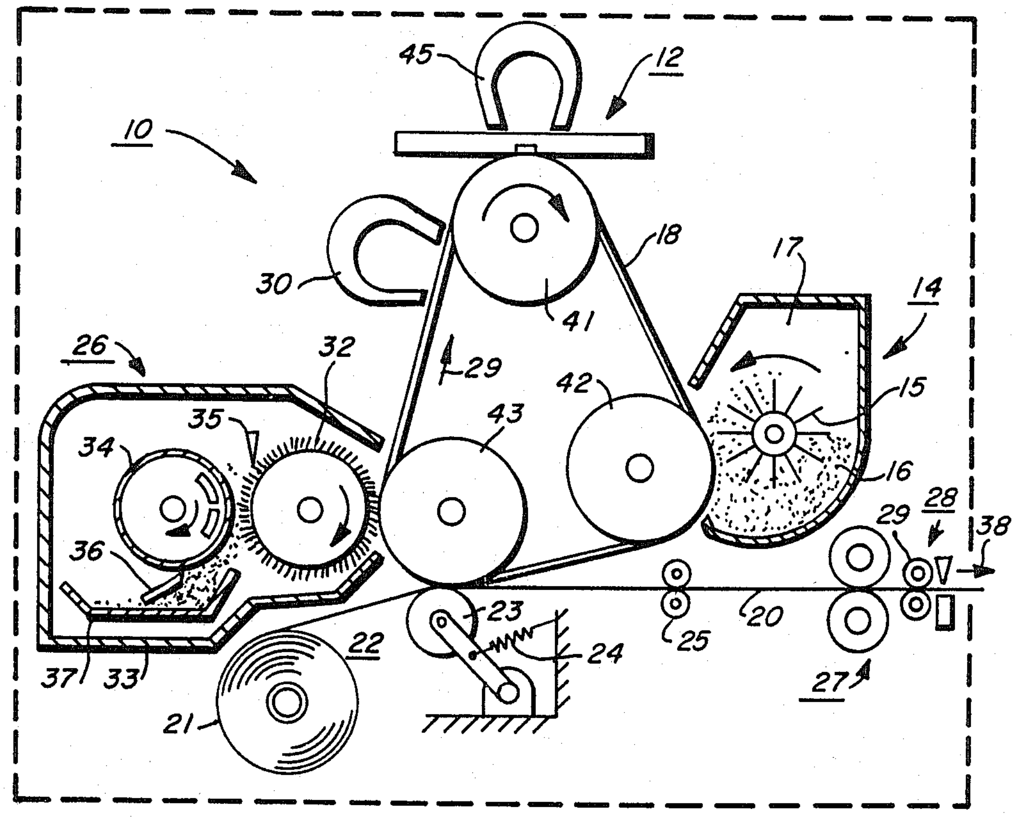
FIG. 1 is a schematic system diagram of a thermoremanent magnetic imaging system which incorporates the process and apparatus which forms the subject matter of this invention.
Figure 2:
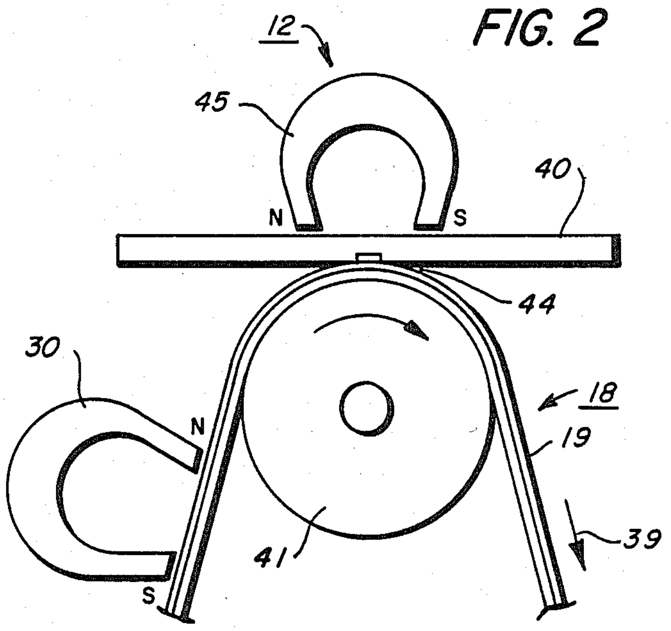
FIG. 2 is an enlarged schematic views of a portion of the diagram of FIG. 1, showing an elevation view of the nip formed by the thermal printhead and a force-biased roller with the recording medium sandwiched in between and the magnetic field producing magnets.
Figure 3:
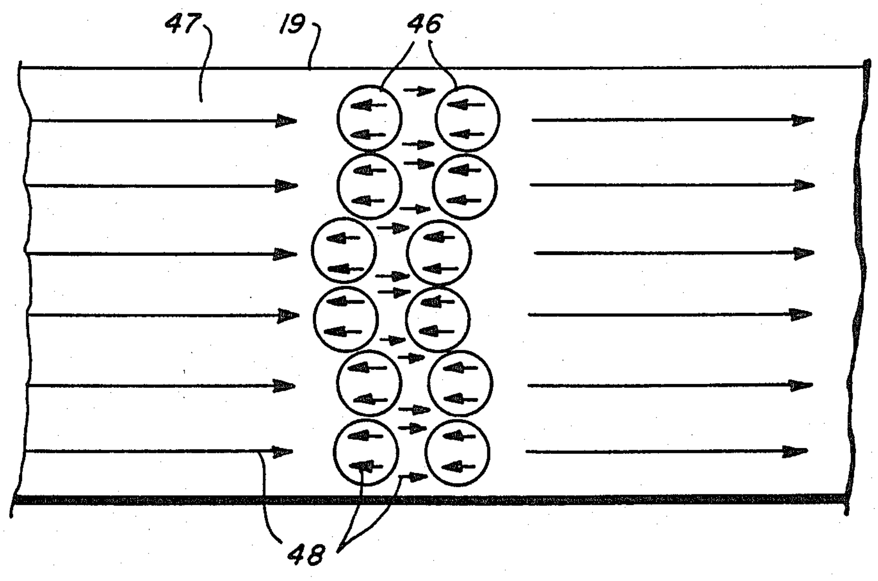
FIG. 3 is a schematic representation illustrating the magnetic pole directions of the pixels and the pre-magnetized background area after the pixels have been formed by the thermal printhead in the presence of a magnetizing field at the nip.

Referring to the system diagram of FIG. 1, there is shown a thermoremanent magnetic imaging system, generally designated by the numeral 10, incorporating a magnetic imaging station 12 configured to operate in accordance with the imaging process of the present invention, more fully described later with reference to FIGS. 2 and 3. The imaging system 10 includes a series of process stations through which a recording medium 18 in the form of an endless belt mounted over rollers 41, 42 and 43 passes. Although the preferred embodiment uses an endless belt configuration for the recording medium, various other configurations could be used equally as well such as, for example, one having a supply roll and a takeup roll which may be rewound when the supply is depleted. Beginning with the imaging station 12, the recording medium 18 proceeds past a development station 14, a transfer station 22, and a cleaning station 26 in the direction of arrow 29. The development, transfer and cleaning stations are typical stations well known in the magnetography field.

At development station 14, a rotating brush or paddle wheel 15, housed in hopper 17, presents magnetic toner 16 onto the recording surface 19 of recording medium 18. The toner is attracted and held by the latent magnetic image and is transferred to a permanent material 20, such as paper, at transfer station 22. After the developed image is transferred, the recording medium proceeds past cleaning station 26, past a pre-magnetizing magnets 30 and back to the imaging station 12.

The developed image is pressure transferred to the paper 20 at the transfer station 22. The paper is provided by supply roll 21 which is pulled through the transfer station via drive rolls 25 and through a toner fixing station 27 by drive rolls 29 where the toner image is permanently fixed to the paper moving in the direction of arrow 38. Cutter assembly 28 cuts the paper with the fixed images into separate sheets. The transfer station includes pressure roller 23 which is urged by adjustable spring 24 towards the recording medium as the recording medium moves around support roller 43. The paper is squeezed against the developed toner image between rollers 23 and 43 to effect the pressure transfer. An electrostatic transfer technique, as is well known in the art, could also be used to effect transfer of toner image to the paper.

Subsequent to the developed image transfer, the recording medium is moved past the cleaning station 26 which removes any residual toner not transferred to the paper. A soft brush 32 housed in chamber 33 removes the residual toner from the recording medium 18 and a single magnetic brush roll 34 is used to remove the toner from the brush. A conventional flicker bar 35 is arranged to assist in toner removal from the soft brush and a doctor blade 36 is used on the magnetic brush roll to remove the residual toner from the magnetic brush roll 34 into a collecting tray 37 if toner reclaiming is desired.

A preferred choice for the recording medium 18 is a magnetic tape having a chromium dioxide recording surface sold under the trade name Croyln ® by the E. I. DuPont Company, Wilmington, Del. The Curie point of Crolyn is about 132° C., which is low enough to provide excellent results in a thermoremanent magnetic imaging environment.

The thermoremanent magnetic imaging process which forms the present invention will now be described with reference to FIGS. 2 and 3. The recording medium 18 having a magnetizable layer 19 moves around roller 41 in the direction of arrow 39. The roller 41 forms a nip 44 and urges the surface of the magnetizable layer of the recording medium into contact with a thermal printhead 40 such as the one marketed by the Rohm Corporation under the designation Rohm Kh-106-6 or a 300 spi thermal printer sold by the Mitsubishi Electric Corporation of Japan under the designation S 215-12. The biasing force of the roller 41 may be varied from 0.1 to 6 pounds per lineal inch (pli), but the preferred range is 1 to 4 pli.

The magnetizable surface of the recording medium is pre-magnetized by permanent magnet 30 having pre-magnetization field of between 600 and 4000 Oe; the preferred field strength is about 1600 Oe. At the image nip 44, the thermal elements of the printhead are activated by the selective application of a voltage across the individual heating element according to data signals received from a controller (not shown) to heat, in image configuration, small areas or pixels of the magnetizable surface above the Curie point of the magnetizable surface in the presence of a magnetizing field produced by permanent magnet 45. Magnet 45 has a polarity opposite to that produced by pre-magnetizing magnet 30. The magnetization field at the nip produced by magnet 45 should be below the coercivity of the magnetizable layer 19 and, in the preferred embodiment, limited to ⅓ to 2/5 that of the pre-magnetizing magnet 30. Therefore, the magnetic field at the nip is about 500 Oe or less. The field strength of magnet 45 is too weak to have an appreciable affect on the pre-magnetized recording medium, except in areas heated above the record medium Curie point.

When the thermal elements of the printhead are activated by the data signals to form pixels in image configuration, the pixels on the magnetizable surface of the recording medium are heated to the Curie point of the magnetizable surface. This heating is done at the nip so that the pre-magnetization in the pixels is erased and the magnetizing field of magnet 45 is able to induce a magnetism in the pixels having a magnetic polarity opposite to that of the pre-magnetized background area. The activation or heating time of the thermal elements in conjunction with the surface speed of the recording medium enables the heated pixel areas to cool while still in the magnetic field at the nip, thus fixing the switched magnetization regions in the pixels areas, as seen in FIG. 3. The opposing magnetization 48 in the pre-magnetized background area 47 and the pixel regions 46 form fringe fields which attract and hold magnetic toner during subsequent development of the latent magnetic image which is formed by the pixels 46.

The interburn time, that is the time between thermal element activation, is optionally of a duration of between 1–13 ms which assures appropriate spacings between succeeding pixels. As discussed above, this is important for copy quality, because if the pixel magnetization regions are too close together the infringe fields occur only around the periphery of a group of pixels. This leaves areas which weakly attract and hold toner, even though it is part of the image. Therefore, if this situation exists, blank spaces may be visible in the final copy.

The moving magnetizable surface of the recording medium must be heated to the Curie point in image configuration composed of separate pixels and cooled in the presence of a fixed magnetic field located at the nip. In this case, the erased pre-magnetization will be induced again in the pixels by the surrounding pre-magnetized area if the pixels are left with zero magnetization. The magnetization of the pixel regions will not be switched if the pixel area cools below the Curie point outside the opposing magnetic field of the nip. If the voltage which activates the printhead thermal elements are too large the pixel is heated much beyond the Curie point and takes too long to cool, so that the moving recording medium maybe outside the opposing fixed field when its cools. This also means the pixels are too large and they begin to merge together, moving the fringe fields, if any, to the outer periphery of the pixel clusters. If the voltage is too low, the pixels are too small and the resulting fringe fields do not attract and hold enough toner. The copies in this situation are too light because an adequate density was not achieved.

Other important parameters of the imaging station which affect the pixel size and spacing are the thermal element activation times, the contact pressure of the recording medium to the printhead, and surface speed of recording medium relative to the printhead and opposing magnetic field.

The conditions for producing latent magnetic images according to this invention has been established as follows:

| Parameter | Available Range | Optimum Value |
|---|---|---|
| I. Rohm Kh-106 Thermal Printhead | | |
| Voltage across thermal elements | 12–14 volts | 12.5 volts |
| Time between pixels | 4–15 ms | 13 ms |
| Thermal element on time | 1 ms | 1 ms |
| Roller pressure against printhead | 1–4 pli | 1–3 pli |
| Recording medium surface speed | 0.5–7 ips | 0.5 ips |
| Pre-magnetization field | 600 to 4000 Oe | 1600 Oe |
| Magnetic field at nip | 50 to 500 Oe | 200 Oe |
| II. MITSUBISHI 300 spi Thermal Printhead (S 215-12) | | |
| Voltage across thermal elements | 13.5–16 volts | 16 volts |
| Time between pixels | 3–13 ms | 8 ms |
| Thermal element on time | 1 ms | 1 ms |
| Roller pressure against printhead | 1–4 pli | 4 pli |
| Recording medium surface speed | 0.5 to 5 ips | 0.5 ips |
| Pre-magnetization field | 600 to 4000 Oe | 1600 Oe |
| Magnetic field at | 50 to 500 Oe | 200 Oe |

In recapitulation, the present invention provides the method and apparatus for increasing the energy efficiency of a thermal printhead used in a thermoremanent magnetic imaging environment, while improving the effectiveness of the resultant latent magnetic image in a magnetic recording produced thereby so that the latent magnetic image attracts and holds magnetic toner in an efficient manner. This results in a high quality permanent copy. Specifically, the magnetic recording medium is pre-magnetized prior to entering a nip formed between a commercially available thermal printhead, heating pixels of the recording medium to the Curie point in image configuration while in a magnetic field opposite in polarity to that of the pre-magnetization, and allowing the pixels to cool in the magnetic field to switch the magnetic poles within the pixels to obtain fringe fields between the pixels and the pre-magnetized background. The magnetic field at the nip has a strength small enough not to switch the magnetic poles of the background area, viz., $\frac{1}{3}$ to 2/5 the coercivity of that of the pre-magnetization. Optimum values of the parameters for the thermomagnetic imaging system have been disclosed above.

Many modifications and variations are apparent from the foregoing description of the invention and all such modifications and variations are intended to be within the scope of the present invention.

We claim:

1. A method of thermoremanent magnetic imaging employing a thermal printhead having a linear array of heating elements to heat only individual small areas of magnetizable surface of a recording medium in image configuration one line of small areas at a time, thus producing information in the form of latent magnetic images formed of the small heated areas for subsequent development and transfer to a permanent record, the method comprising the steps of:

(a) moving the recording medium through a nip formed by the thermal printhead and a pressure applying means, so that the magnetizable surface of the recording medium is in relatively light pressure contact with the heating elements of the thermal printhead;

(b) pre-magnetizing the magnetizable surface of the recording medium in a uniform, in-plane fashion with a pre-magnetizing field having a selected polarity prior to entry of the recording medium into the nip, so that the pre-magnetized surface has its magnetic poles oriented all in one direction;

(c) providing a magnetizing field at said nip having a lower strength and opposite magnetic polarity to that of the pre-magnetizing field of step (b);

(d) applying voltages of predetermined duration across the heating elements of the thermal printhead in a manner to heat a plurality of small areas in the pre-magnetized surface in image configuration above their Curie point, consecutive applications of voltages for succeeding adjacent small heated areas being separated by a predetermined time interval, so that the individually heated areas are separated from each other and surrounded by pre-magnetization, the surface heating being done in the presence of the magnetizing field at said nip; and (e) allowing the plurality of small heated areas to cool in the presence of the magnetizing field at the nip in order to switch and to freeze direction of the magnetic poles in the small heated and cooled areas, so that magnetic fringe fields are produced at the boundaries between the small areas and the pre-magnetized areas, the resulting fringe fields creating a latent magnetic image that will strongly attract and hold magnetic toner when applied.

2. The method of claim 1, wherein the magnetizing field of step (c) has a strength of about $\frac{1}{3}$ to 2/5 that of the pre-magnetizing field of step (b).

3. A thermoremanent magnetic imaging station for use in a magnetographic printing machine to produce latent magnetic images on a magnetizable surface of a moving recording medium for subsequent development and transfer to a permanent copy substrate, the magnetic imaging station comprising:

a thermal printhead having a plurality of thermal heating elements which are individually heated by the application of a voltage of predetermined duration in accordance with data signals supplied thereto;

a pressure applying roller which forms a nip with the thermal printhead, the recording medium being sandwiched between the thermal printhead and the pressure roller, so that the magnetizable surface of the recording medium is in pressure contact with the heating elements of the thermal printhead as the recording medium moves therethrough;

a first magnetizing source positioned upstream from the nip to apply a pre-magnetization to the entire magnetizable surface of the recording medium prior to entry by the recording medium into said nip, the first magnetizing source having a polarity which orients the magnetic poles in the pre-magnetized surface all in one direction;

a second magnetizing source positioned at said nip, the second source having a field strength lower than and a polarity opposite to that of the first magnetizing source, the position of said second magnetizing source providing a magnetic field through which the recording medium passes as it moves through the nip;

each heating element being adapted upon the application of a voltage thereto in response to said data signals to heat serially a plurality of small areas of the pre-magnetized surface of the recording medium above the Curie point temperature for said surface, consecutive applications of voltage to each heating element for heating succeeding adjacent small areas being separated by a predetermined time interval, so that the individually heated small areas are separated from each other and surrounded by said premagnetization; and the movement of the recording medium surface through the nip being adjusted to allow the small heated areas to cool while still in the magnetizing field of said second magnetizing source so that the magnetic poles in the small areas have been switched and frozen therein, producing fringe fields between the small areas and the pre-magnetized areas, which fringe fields represent the latent magnetic images that upon development thereof with toner will provide a high quality development image with adequate toner density.

4. The magnetic imaging station of claim 3, wherein the thermal printhead is a Rohm Kh-106-6 printhead by the Rohm Corporation.

5. The magnetic imaging station of claim 4, wherein the pressure roller applies a lineal pressure of 1 to 2 pli; wherein the data signals produce a voltage across the heating elements of 12.5 volts for approximately 1 ms of duration per small area heated; and wherein the surface speed of the recording medium is 0.5 ips.

6. The magnetic imaging station of claim 4, wherein the time between activations of each of the heating elements by the data signals is 13 ms.

7. The magnetic imaging station of claim 3, wherein the thermal printhead is a 300 spi printhead sold by Mitsubishi Electric Corporation of Japan as Model S 215-12.

8. The magnetic imaging station of claim 7, wherein:

(a) the pressure roller applies a lineal pressure of 4 pli;

(b) the surface speed of the recording medium is 0.5 ips;

(c) the data signals produce a voltage across the heating elements of 16 volts for approximately 1 ms of duration per small area heated; and (d) the time between activation of each of the heating elements by the data signals is 8 ms, in order to provide enough spacing between the successively produced small areas to assure the production of infringe fields between each small area and the pre-magnetized background areas and to prevent the small areas from clustering together with fringe fields being produced around the periphery of the clusters with the fringe fields inside the clusters collapsing.

* * * * *